United States Patent [19]

Noah

[11] 4,059,912
[45] Nov. 29, 1977

[54] IDENTIFICATION STICKER
[76] Inventor: James D. Noah, 2300 Race St., Fort Worth, Tex. 76111
[21] Appl. No.: 715,919
[22] Filed: Aug. 19, 1976
[51] Int. Cl.² .................................................. A44C 3/00
[52] U.S. Cl. ......................................... 40/2 R; 40/135; 40/125 E
[58] Field of Search ............... 40/2, 2.2, 28 C, 135, 40/125 E, 125 F, 133; 35/26, 66

[56] References Cited
U.S. PATENT DOCUMENTS

| | | | |
|---|---|---|---|
| 1,720,441 | 7/1929 | Rivkin | 40/28 C |
| 2,100,840 | 11/1937 | Elmore | 40/2.1 |
| 3,315,386 | 4/1967 | Kest et al. | 40/2 R |

FOREIGN PATENT DOCUMENTS

| 291,210 | 5/1928 | United Kingdom | 40/28 C |
|---|---|---|---|

Primary Examiner—Louis G. Mancene
Assistant Examiner—Wenceslao J. Contreras
Attorney, Agent, or Firm—James C. Fails

[57] ABSTRACT

An identification display formed by three sheets laminated together and comprising a peel-off base layer secured with adhesive to the bottom side of an intermediate layer and a top layer removably secured to the top side of the intermediate layer. The peel-off base layer is removable to allow the intermediate layer to be secured to an object for identification purposes. The top sides of the top and intermediate layers have contrasting colors. A matrix of figures of a predetermined shape are cut into the top layer and are separately removable to form different symbols which are readily distinguishable due to the contrasting colors of the top sides of the top and intermediate layers.

7 Claims, 5 Drawing Figures

U.S. Patent  Nov. 29, 1977  4,059,912
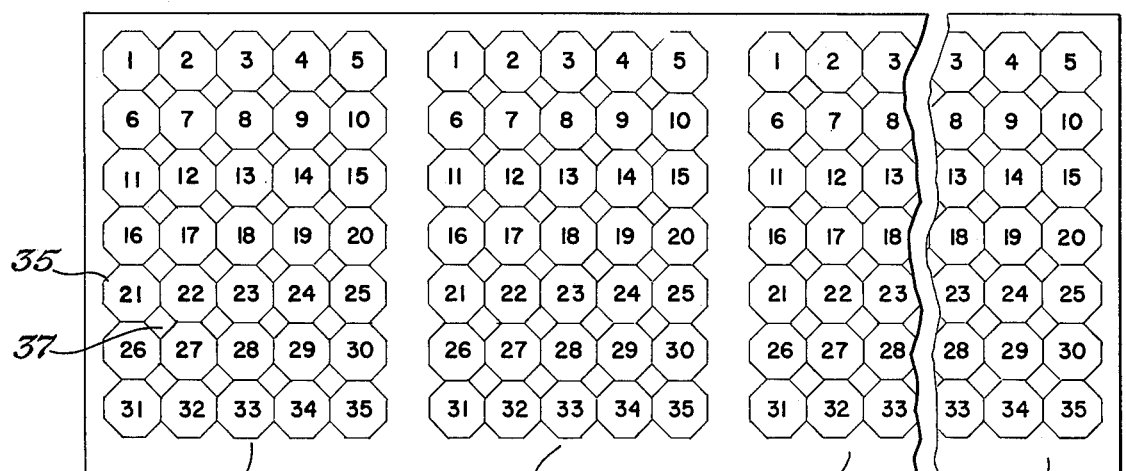
Fig.1
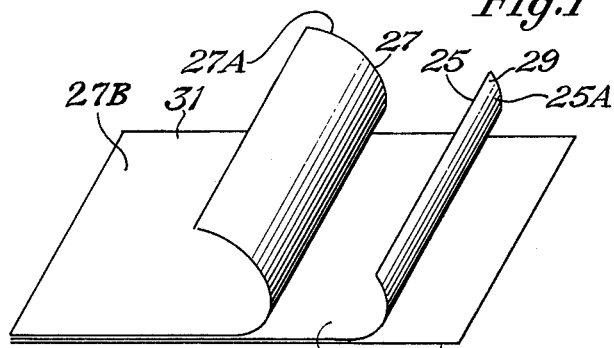
Fig.2
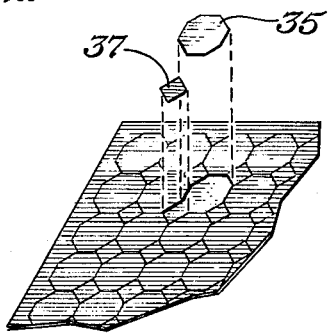
Fig.3
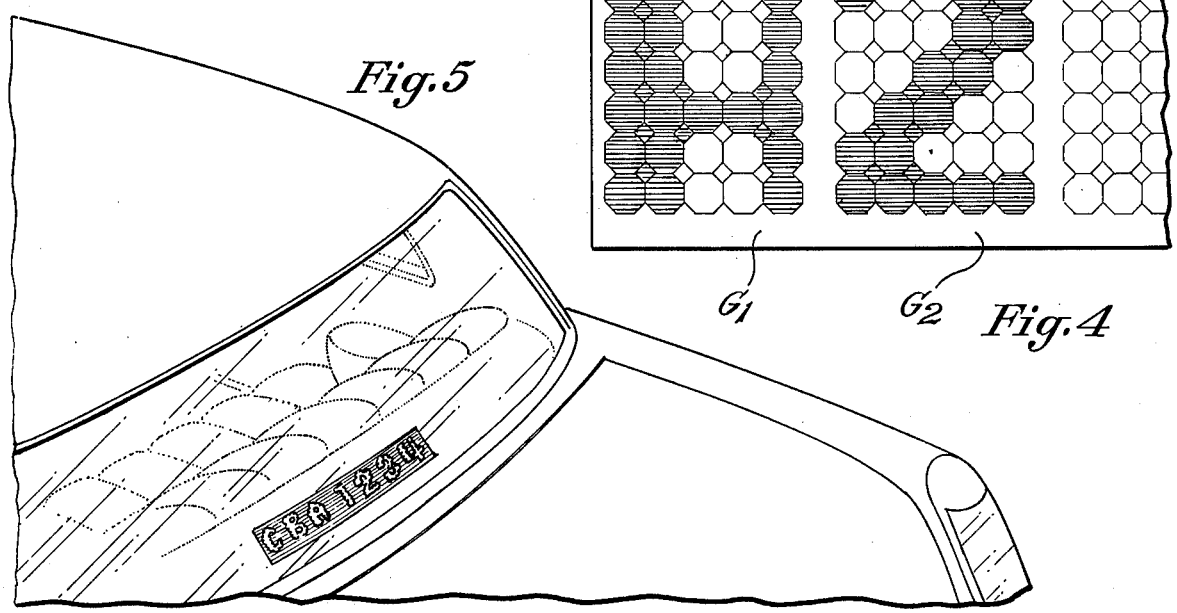
Fig.5
Fig.4

IDENTIFICATION STICKER

BACKGROUND OF THE INVENTION

This invention relates to an identification means and more particularly to a sticker for use for identification purposes.

SUMMARY OF THE INVENTION

It is an object of the present invention to provide an economic and easy to use display for forming different symbols and which may be secured in place for use for identification purposes such as for identifying CB call numbers, house numbers, boat registration numbers, names, etc.

It is a further object of the present invention to provide a sticker formed of laminated layers of contrasting colors in which one layer has figures of a predetermined shape cut therein and which are separately removable to form symbols which are readily distinguishable due to the contrasting colors of the layers.

The display is formed by three flexible sheets laminated together and comprising a first layer removably secured with adhesive to a first side of an intermediate layer and a third layer having a first side removably secured to the second side of the intermediate layer. The first layer is removable to allow the intermediate layer to be secured in place to an object. The second side of the third layer has a color different from that of the second side of the intermediate layer. A group of like figures of a predetermined shape are cut into the third layer. The figures are separately removable to expose the second side of the intermediate layer within the space resulting from removal of the figures for forming different symbols and which are readily distinguishable due to the difference in color between the second sides of the intermediate and third layers.

In a further aspect, the figures of said group are formed in rows and columns. The rows and columns of figures are sufficient such that any letter of the alphabet or any number from 0 through 9 may be formed by removing selected ones of the figures. The sticker may comprise a single group of figures for forming a single symbol or a plurality of spaced apart groups of figures for forming different combinations of symbols.

BRIEF DESCRIPTION OF THE DRAWINGS

FIG. 1 is a top view of the sticker of the present invention illustrating the manner in which figures of a preferred embodiment are cut into the top layer of the sticker;

FIG. 2 illustrates the layers forming the sticker of the present invention;

FIG. 3 illustrates the manner in which the figures of the sticker may be removed to form desired symbols;

FIG. 4 illustrates several symbols formed by removing selected figures from the top layer of the sticker; and FIG. 5 illustrates the sticker of the present invention attached to the windshield of an automobile for identifying a CB call number.

DETAILED DESCRIPTION OF THE INVENTION

Referring now to the drawings, the sticker of the present invention is identified by reference numeral 21. It is formed by three flexible sheets 23, 25 and 27 laminated together. Sheet 23 is defined as a base layer and is removably secured with adhesive 29 to the bottom side 25A of the intermediate layer 25. Sheet 27 is defined as the top layer and has its bottom side 27A removably secured with an adhesive 31 to the top side 25B of the intermediate layer 25. The top side 27B of layer 27 has a color which contrasts with the color of the top side 25B of the intermediate layer 25. For example, the color of the top side 27B of layer 27 may be red and the color of the top side 25B of layer 25 may be yellow. Other contrasting colors for the top sides of layers 27 and 25 respectively may be blue and white, red and white, etc.

Cut into the top layer 27 are a plurality of equally spaced apart groups or matrices $G_1, G_2, G_3, \ldots G_N$ of closed plane FIGS. 35 of a predetermined shape. The FIGS. 35 are in rows and columns and may be separately removed with the use of a sharp knife or other instrument to expose the top side 25B of the intermediate layer 25 within the spaces resulting from removal of the figures to form different symbols which are readily distinguishable due to the difference in color between the top sides of the layers 27 and 25. In FIG. 4, the symbols A and 2 have been formed in the groups $G_1$ and $G_2$ respectively by the removal of selected ones of the FIGS. 35. In FIG. 4, the cross-hatch depicts the exposed top side 25B of the layer 25 as seen in the spaces resulting from the removal of the figures from the layer 27. In the preferred embodiment, the FIGS. 35 are in the shape of an octagon and engage each other in adjacent rows and columns. The shape of an octagon is preferred since it allows a more definitive solid line letter or number to be formed with a minimum number of rows and columns of the figures. Preferably each group has seven rows and five columns thereby providing a set of 35 octagons which is sufficient to construct any letter of the alphabet and any number from 0 through 9. In FIG. 1 the figures in each group or set has been numbered from 1 to 35 for use with instructions to instruct the user which figures to remove to form the desired letters of the alphabet and the numbers from 0 through 9. It is to be understood that each set may have more or less than 35 octagons depending on the style of the letters of the alphabet and of the numbers desired. By forming the FIGS. 35 in the shape of octagons, small squares 37 are formed in other rows and columns between the rows and columns of the FIGS. 35. These small squares also may be removed with a knife or sharp instrument better to define the letter or number desired to be constructed.

In using the sticker, the desired letter or number is formed by selectively removing the FIGS. 35 and 37. The base layer 23 is peeled off to allow the bottom side of the base layer 23 to be secured in place to the desired object.

The sticker may have only one group of figures or a plurality of groups of figures cut into the top layer. For example, for constructing a CB call number, the sticker will have seven groups $G_1-G_N$ cut into the top layer whereby the desired call number may be formed. Such a number is shown formed on the sticker in FIG. 5 and which has been attached to the rear window of an automobile. The sticker may be sold in pre-cut strip form or in roll form. If the sticker is to be sold in strip form for use for a specific purpose it will be cut to the desired length sufficient to have a given number of groups of figures. For example, if the strip is to be sold for forming CB call numbers it will be cut to a length sufficient to have seven groups of figures. If the sticker is sold in roll form, the user may cut off a desired length as needed to form a sticker having the desired number of groups of figures depending upon the intended use of the sticker.

In one embodiment, the base layer 23 is a 60 pound Kraft backing sheet. The intermediate layer 25 is a two mil thickness milar sheet and the top layer 27 is a four mil thickness vinyl sheet. The adhesive used between layers 23 and 25 and between layers 25 and 27 may be a conventional removable adhesive. The Kraft sheet forming layer 23 is treated with a silicone to allow it to be pulled off clean whereby the adhesive will remain on the bottom side 25A of the layer 25. When the figures 35 and 37 are removed, the adhesive will remain on the bottom side of the figures whereby the exposed top side 25B of the layer 25 will be left clean with no adhesive. In forming the sticker, the three layers 23, 25 and 27, of a given length, are laminated and the groups of figures then cut into the top layer 27 with a suitable die. In one embodiment the octagons have a height and width of ⅜ of an inch.

Typical of the conventional removable adhesives are those defined in HACKH'S CHEMICAL DICTIONARY, 4th edition, Julius Grant, editor, McGraw Hill Book Company, New York, New York, 1969.

The following instructions are applicable for forming the letters of the alphabet. The numbers referred to are the numbered octagons to be removed to form the specified letters.

| | | |
|---|---|---|
| A | — remove Nos. | -2-3-4-6-7-10-11-12-15-16-17-20-21-22-23-24-25-26-27-30-31-32-35. |
| B | — remove Nos. | -1-2-3-4-6-7-10-11-15-16-17-18-19-21-22-25-26-27-30-31-32-33-34. |
| C | — remove Nos. | -2-3-4-6-7-10-11-12-16-17-21-22-26-27-30-32-33-34. |
| D | — remove Nos. | -1-2-3-4-6-7-10-11-12-15-16-17-20-21-22-25-26-27-30-31-32-33-34. |
| E | — remove Nos. | -1-2-3-4-5-6-7-11-12-16-17-18-19-21-22-26-27-31-32-33-34-35. |
| F | — remove Nos. | -1-2-3-4-5-6-7-11-12-16-17-18-19-21-22-26-27-31-32. |
| G | — remove Nos. | -2-3-4-6-7-10-11-12-16-17-19-20-21-22-25-26-27-30-31-32-33-34. |
| H | — remove Nos. | -1-2-5-6-7-10-11-12-14-15-16-17-18-19-20-21-22-25-26-27-30-31-32-33-34. |
| I | — remove Nos. | -3-4-8-9-13-14-18-19-23-24-28-29-33-34. |
| J | — remove Nos. | -4-5-9-10-14-15-19-20-21-24-25-26-29-30-32-33-34. |
| K | — remove Nos. | -1-2-5-6-7-10-11-12-14-16-17-18-21-22-24-26-27-30-31-32-35. |
| L | — remove Nos. | -1-2-6-7-11-12-16-17-21-22-26-27-31-32-33-34-35. |
| M | — remove Nos. | -2-4-6-8-10-11-13-15-16-18-20-21-23-25-26-28-30-31-33-35. |
| N | — remove Nos. | -1-5-6-7-10-11-12-13-15-16-17-18-19-20-21-23-24-25-26-29-30-31-35. |
| O | — remove Nos. | -2-3-4-6-7-10-11-12-15-16-17-20-21-23-24-25-26-29-30-31-35. |
| P | — remove Nos. | -1-2-3-4-6-7-10-11-12-15-16-17-18-19-21-22-26-27-31-32. |
| Q | — remove Nos. | -2-3-4-6-7-10-11-12-15-16-17-20-21-22-23-25-26-27-29-30-32-33-34. |
| R | — remove Nos. | -1-2-3-4-6-7-10-11-12-15-16-17-18-19-21-22-25-26-27-30-31-32-35. |
| S | — remove Nos. | -2-3-4-6-10-11-12-13-14-17-18-19-20-24-25-26-30-32-33-34. |
| T | — remove Nos. | -1-2-3-4-5-8-9-13-14-18-19-23-24-28-29-33-34. |
| U | — remove Nos. | -1-5-6-7-10-11-12-15-16-17-20-21-22-25-26-27-30-32-33-34. |
| V | — remove Nos. | -1-2-5-6-7-10-11-12-15-16-17-20-21-22-25-27-28-29-33. |
| W | — remove Nos. | -1-3-5-6-8-10-11-13-15-16-18-20-21-23-25-26-28-30-32-34. |
| X | — remove Nos. | -1-2-5-6-7-10-11-12-14-17-18-22-23-24-26-29-30-31-34-35. |
| Y | — remove Nos. | -1-2-5-6-7-10-11-12-15-16-17-19-22-23-28-33. |
| Z | — remove Nos. | -1-2-3-4-5-9-10-13-14-17-18-21-22-26-31-32-33-34-35. |

The following instructions are applicable for forming the numbers 0 through 9. The numbers referred to are the octagons to be removed to form the specified numbers.

| | | |
|---|---|---|
| 0 | — remove Nos. | -2-3-4-6-10-11-15-16-20-21-25-26-30-32-33-34. |
| 1 | — remove Nos. | -2-3-4-8-9-13-14-18-19-23-24-28-29-32-33-34-35. |
| 2 | — remove Nos. | -2-3-4-6-9-10-14-15-18-19-22-23-26-27-30-31-32-33-34-35. |
| 3 | — remove Nos. | -2-3-4-6-9-10-14-15-17-18-19-24-25-26-29-30-32-33-34. |
| 4 | — remove Nos. | -3-4-5-7-9-10-11-14-15-16-19-20-21-22-23-24-25-29-30-34-35. |
| 5 | — remove Nos. | -1-2-3-4-5-6-11-12-13-14-16-17-18-19-20-25-26-29-30-32-33-34. |
| 6 | — remove Nos. | -2-3-4-6-7-10-11-12-16-17-18-19-21-22-25-26-27-30-32-33-34. |
| 7 | — remove Nos. | -1-2-3-4-5-6-9-10-14-15-18-19-22-23-26-27-31-32. |
| 8 | — remove Nos. | -2-3-4-6-7-10-11-12-15-17-18-19-21-24-25-26-29-30-32-33-34. |
| 9 | — remove Nos. | -2-3-4-6-9-10-11-14-15-17-18-19-20-24-25-26-29-30-32-33-34. |

Although in the preferred embodiment, the FIGS. 35 have the shape of an octagon, they may have other shapes such as that of a circle which will result in the construction of letters and numbers nearly as good as that formed by the use of octagon shaped figures. Although less desirable but acceptable in some cases, the FIGS. 35 may have the shape of a hexagon or of a square. It is to be understood that other types of figures, style of lettering and the like may be employed depending upon the use of the display.

The sheets of material that have been illustrated and described herein have been flexible, since this embodiment readily fits curved automobile windows and the like. If desired, however, the display may have one or more of the sheets rigid.

Moreover, the described application of a sticker is not to be considered limiting, since the display is widely useful in forming signs and the like.

Although the invention has been described with a certain degree of particularity, other arrangements and combinations can be employed without departing from the spirit and scope of this invention.

I claim:

1. A display adapted to be attached to an object, comprising:

three sheets of material laminated together and comprising a first layer, a second intermediate layer, and a third layer; said second intermediate layer being sandwiched between said first and third layers;

each of said layers having respective first and second opposite sides;

said first layer being removably secure to said first side of said second intermediate layer with an adhesive such that when said first layer is removed, said first side of said second intermediate layer may be secured to an object with said adhesive;

said first side of said third layer being removably secure to said second side of said second intermediate layer;

said second side of said third layer having a color different from that of said second side of said second intermediate layer;

a plurality of spaced apart groups of like elements of a predetermined shape kiss cut only into said third layer;

said elements being separately removable to expose said second side of said second intermediate layer within the spaces resulting from removal of said elements for forming respective different symbols and which symbols are readily distinguishable due to the difference in color between said second sides of said second intermediate and third layers;

said elements of each said group being located in respective rows and columns adjacent and contiguous each other and being sufficient in number such that any letter of the alphabet and any number from zero through nine may be formed by selective removal of said elements from said third layer to expose said second side of said second intermediate layer of a different color to create a final design that can be secured to said object.

2. The display of claim 1 wherein:
said group has seven rows and five columns.

3. The display of claim 1 wherein:
the shape of each of said like elements is such that other elements of a predetermined shape are formed in other rows and other columns between said rows and columns of said like elements,
said other elements being separately removable.

4. The display of claim 3 wherein:
said like elements are octagonal in shape.

5. The display of claim 3 wherein:
said like elements are circular in shape.

6. The display of claim 1 wherein:
said sheets of material are flexible.

7. A display comprising:
at least two sheets of material laminated together and comprising a top layer and a second layer;
each of said layers having first and second opposite sides;
said first side of said top layer being removably secured to said second side of said second layer;
said second side of said top layer having a visible surface property different from that of said second side of said second layer;
a plurality of groups of like elements of a predetermined shape kiss cut into said top layer,
said elements being separately removable to expose said second side of said second layer within the spaces resulting from removal from said elements for forming different symbols and which symbols are readily distinguishable due to the difference in visible surface property between said second sides of said second and top layers; said elements being arranged in respective rows and columns adjacent and contiguous each other and being sufficient in number such that any letter of the alphabet and any number from zero through nine may be formed by selective removal of said elements to expose the different visible property of the second side of said second layer for forming a desired design in said display.

* * * * *